United States Patent
Maciej et al.

(10) Patent No.: US 9,701,226 B2
(45) Date of Patent: Jul. 11, 2017

(54) VEHICLE SEAT WITH A CRASH-MODIFIED PANEL HOLDER

(71) Applicant: Sitech Sitztechnik GmbH, Wolfsburg (DE)

(72) Inventors: Steffen Maciej, Magdeburg (DE); Jens Bratge, Ingersleben (DE)

(73) Assignee: Sitech Sitztechnik GmbH, Wolfsburg (DE)

( * ) Notice: Subject to any disclaimer, the term of this patent is extended or adjusted under 35 U.S.C. 154(b) by 62 days.

(21) Appl. No.: 14/872,819

(22) Filed: Oct. 1, 2015

(65) Prior Publication Data

US 2016/0096452 A1    Apr. 7, 2016

(30) Foreign Application Priority Data

Oct. 1, 2014 (DE) .................. 10 2014 219 978

(51) Int. Cl.
| | |
|---|---|
| *B60N 2/42* | (2006.01) |
| *B60R 21/00* | (2006.01) |
| *B60N 2/427* | (2006.01) |
| *B60N 2/60* | (2006.01) |
| *B60N 2/58* | (2006.01) |
| *B60N 2/50* | (2006.01) |

(52) U.S. Cl.
CPC .......... *B60N 2/427* (2013.01); *B60N 2/6009* (2013.01); *B60N 2/42709* (2013.01); *B60N 2/42727* (2013.01); *B60N 2/42754* (2013.01); *B60N 2/42781* (2013.01); *B60N 2/502* (2013.01); *B60N 2/5825* (2013.01); *B60N 2/60* (2013.01); *B60N 2/6018* (2013.01); *B60N 2/6027* (2013.01); *B60N 2/6045* (2013.01)

(58) Field of Classification Search
CPC ........ B60N 2/6009; B60N 2/427; B60N 2/60; B60N 2/6018; B60N 2/6027; B60N 2/6045; B60N 2/42709; B60N 2/42727; B60N 2/42754; B60N 2/42781; B60N 2/5825; B60N 2/502
USPC ..... 297/216.1, 216.15, 216.2, 311, 322, 337, 297/452.55
See application file for complete search history.

(56) References Cited

U.S. PATENT DOCUMENTS

| | | | | |
|---|---|---|---|---|
| 4,458,919 | A * | 7/1984 | Kawashima | A61G 3/0808 280/751 |
| 5,288,126 | A * | 2/1994 | Saul | A47C 1/0355 297/322 |
| 5,839,782 | A * | 11/1998 | Kashiwamura | B60N 2/548 297/216.1 |
| 6,648,398 | B2 * | 11/2003 | Duffy | B60P 3/39 16/290 |

(Continued)

FOREIGN PATENT DOCUMENTS

| | | | |
|---|---|---|---|
| DE | 1020088049117 | * | 4/2010 |
| DE | 10 2014 012 011 A1 | | 3/2015 |

*Primary Examiner* — Chi Q Nguyen
(74) *Attorney, Agent, or Firm* — Muncy, Geissler, Olds & Lowe, P.C.

(57) ABSTRACT

A panel holder made of at least one wire which features at least one element for fastening the panel holder to a fixed structure adjacent to the panel holder, and at least one element for fastening the panel holder to a panel. The wire forms a support bracket which in the assembled state of the panel holder and the panel is arranged in a critical region of the panel in which in the event of a crash, a strong crash force acts on the panel.

19 Claims, 2 Drawing Sheets

(56) References Cited

U.S. PATENT DOCUMENTS

| | | | | |
|---|---|---|---|---|
| 7,523,803 B2* | 4/2009 | Breed | ................... | H04Q 9/00 180/273 |
| 7,837,261 B2* | 11/2010 | Baumann | ............... | B64D 11/06 297/216.1 |
| 7,976,060 B2* | 7/2011 | Breed | ................... | B60N 2/002 180/273 |
| 9,061,621 B2* | 6/2015 | Hisamoto | ............ | B60N 2/1615 |

* cited by examiner

VEHICLE SEAT WITH A CRASH-MODIFIED PANEL HOLDER

This nonprovisional application claims priority under 35 U.S.C. §119(a) to German Patent Application No. 10 2014 219 978.6, which was filed in Germany on Oct. 1, 2014, and which is herein incorporated by reference.

BACKGROUND OF THE INVENTION

Field of the Invention

The object of the invention is a vehicle seat with a panel holder.

Description of the Background Art

From the prior art it is known to provide covers or shields which are secured to a structure or a seat adjuster by means of fastening elements.

Such fastening elements are also known as seat panel holders. These seat panel holders are mostly wire frames having a complex shape which on the one hand are connected with the seat structure of a vehicle seat, and on the other at all times with the panel.

Tests have shown that especially in a crash situation, the panel is subjected to forces in the region in which a safety belt lies against the panel. These crash forces endanger in particular the structural stability of the panel where the seat belt lies against the panel, in particular the lap belt section of the seat belt. The panel thus has a critical section in the effective range of the forces acting on the panel which, in the event of a crash, in particular a frontal impact crash, is subjected to especially high stresses.

SUMMARY OF THE INVENTION

It is therefore an object of the invention is to provide a panel for a vehicle seat which is optimized in respect of its structural stability.

Known are panels whose structure is reinforced and thus stabilized on the inside with expanding polypropylene inserts in critical regions that are exposed to force. The inserts are adhesively bonded or otherwise fastened to the panel.

An embodiment of the invention provides a panel holder made of at least one wire which features at least one element for fastening the panel holder to a fixed structure located adjacent to the panel holder, and at least one element for fastening the panel holder to a panel.

According to an embodiment of the invention, a provision is made that the wire forms a support bracket arranged in a critical region of the panel in the assembled state of the panel holder and the panel. In the event of a crash, a strong crash force acts on that region of the panel. In an advantageous manner, a force acting from the outside on the panel can impact the support bracket arranged in the critical region without the risk of the panel holder losing its shape or material stability. The panel which is equipped in the critical region with a panel holder and without a support bracket is easily deformable when subjected to strong forces. If a panel holder is configured with a support bracket, the panel is stabilized in the critical region in such a way that a deformation is virtually ruled out. In any case, a destruction of material in the critical region is reliably prevented.

In the critical region, a lap belt section of a safety belt engages in the event of a crash. This lap belt section of the safety belt acts two-dimensionally, with its interior side on the panel and thus on the panel holder. Advantageously, the panel holder in itself and the support bracket integrated in the panel holder, reliably ensure that no destabilization of the panel occurs in the region in which the lap belt section of the safety belt comes into contact with the panel (critical region).

In an embodiment of the invention, a provision is made to ensure that the wire of the panel holder is shaped into a wire frame comprising at least one limb, wherein in the assembled state of the panel holder and the panel, the at least one limb is arranged near the critical region of the panel, or at least partially protrudes into the critical region of the panel. The support bracket can be integrally formed or arranged at the at least one limb, from which at least one limb exits and which in the assembled state is arranged in a central region of the critical region. In an advantageous manner, a wire frame can be formed to which the support bracket can be fastened or integrally formed in the desired position, relative to the panel at the panel holder.

In an embodiment of the invention, a provision is made to ensure that the support bracket comprises at least one clip element which on the one hand supports the panel and absorbs the crash force in the critical region, and on the other supports the panel at the adjacent structure so that the crash force is induced into the adjacent structure. The support bracket can comprise a dual function. It does not only absorb and redirect the crash force, but also supports itself at the adjacent structure so that an optimal application of force on the panel holder and the structure can be achieved.

The at least one clip element of the support bracket thereby successfully induces the crash force via the at least one limb indirectly into the adjacent structure since the at least one limb features a holding element which is fixedly connected with the structure in the assembled state of the panel holder connected with the panel. This effect is also achieved without the at least one clip element directly applying the crash force on the adjacent structure.

Furthermore, the at least one clip element of the support bracket induces the crash force directly into the adjacent structure since the at least one clip element in the installed state of the panel holder which is connected to the panel is supported, on the one hand, at an interior side of the panel and on the other, directly at the adjacent structure. This effect is also achieved without the at least one clip element directly applying the crash force on the adjacent structure.

Preferable is a combination of indirect and direct application of force on the adjacent structure per the detailed description and the exemplary embodiment illustrated in the figures.

The support bracket can be u-shaped, wherein two clip elements of the "U" are arranged transversely to the longitudinal axis of the panel holder that is positioned in the assembled state of the panel holder and the panel, and to a clip element connecting the two clip elements in the direction of the longitudinal axis of the panel holder which is arranged in the assembled state of the panel holder and the panel.

The clip elements are integrally formed or arranged via a further clip element at the at least one limb.

The panel can be a plastic component, in particular formed and manufactured by injection molding. The assembly of the panel and the panel holder as well as the support bracket of the panel holder are described in detail in the following exemplary embodiment.

An exemplary embodiment of the invention is explained as follows: for the purpose of this description, the longitudinal direction of the vehicle is labeled "x". "Y" labels the horizontal direction of the vehicle transversely to the x-direction, and "z" labels the vertical direction of the vehicle transversely to the x-direction. This terminology of spatial directions in Cartesian coordinates corresponds to the system of coordinates generally used in the vehicle industry.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
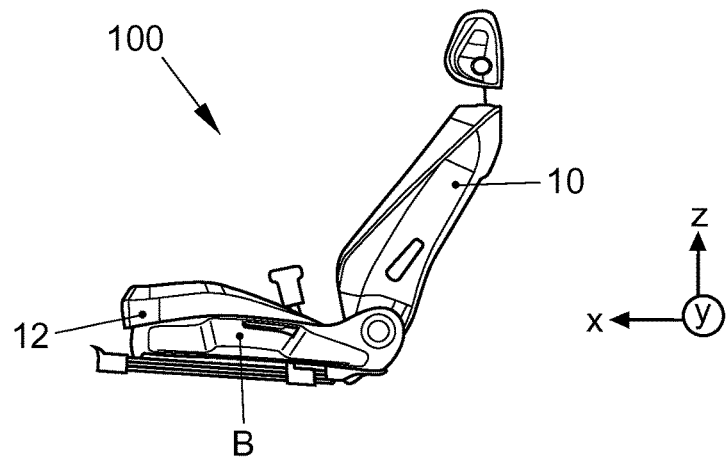
FIG. 1 is a side view of a vehicle seat with a panel in the installed state.

A side view of FIG. 1 shows a vehicle seat 100 with a backrest 10 and a seat portion 12 and a panel B. The panel B is viewed from the longitudinal direction of panel B, running in the x-direction (driving direction), arranged laterally at an adjacent structure of the seat portion 12 that is not further shown. Shown is thus a left panel B in the installed state arranged at the seat portion 12 existing in the assembled state with a panel holder H. The panel holder H is integrated in the panel B in the assembled state.

Figure 2:
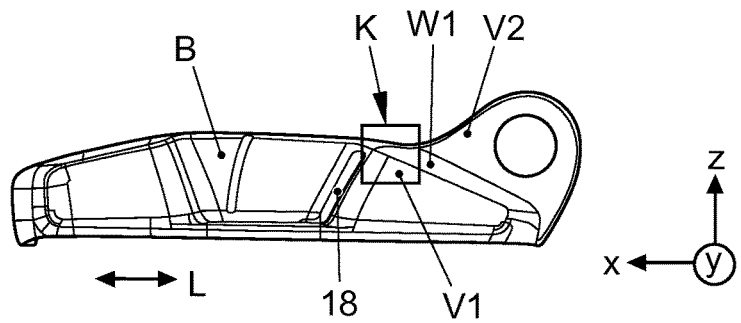
FIG. 2 is an enlarged side view of the outer side of the panel in an individual representation.
Figure 3:
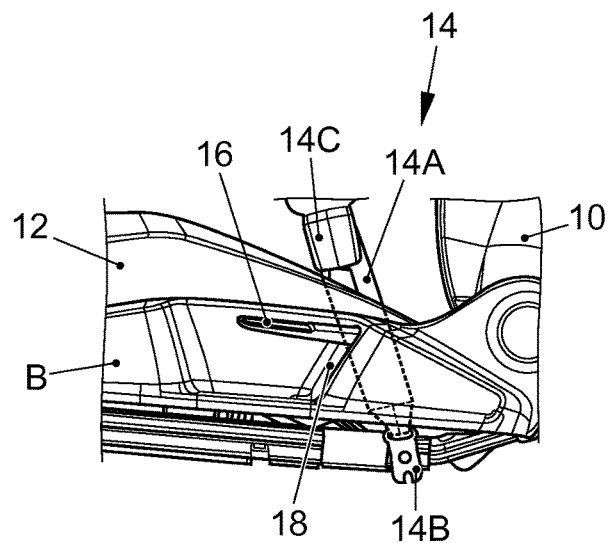
FIG. 3 is an enlarged side view of the outer side of the panel in the installed state of the panel at the vehicle seat.

FIGS. 2 and 3 show an overall view of the panel B in enlarged illustrations, whereby further details are clarified in respect of the assembly of panel B and in respect of the structure of panel B in the lap belt region 14A of the safety belt 14. In addition, a critical region K (see square border in FIG. 2) of the panel B is shown, on which, in the event of a crash, in particular in the event of a frontal impact, the force impacting the panel B in the installed state exposes the panel B and the panel holder H to especially high stresses.

Panel B features a recess formed in the y-direction, into which in the x-direction, a height adjustment lever 16 of the vehicle seat 100 protrudes from a slot-like aperture 18 which is integrated in the panel B. The aperture 18 accordingly points in the x-direction.

Inside the panel B lies a mechanism of the height adjustment lever 16 for which in the panel B, a corresponding installation space is made available.

In the critical region K, the panel B features an essentially first, vertical wall region V1 lying in the x/z plane which transitions to an essentially horizontal wall region W1, which essentially runs opposite an imaginary x/y plane with a slight rearwards slant.

The essentially horizontal wall region W1 transitions to an essentially flange-like, second vertical wall region V2 which is arranged horizontally, analog to the first, vertical wall region V1 in the x/z plane. Here, an aperture for a fitting of the vehicle seat 100 is formed which in the installed state of the panel B, passes through the flange-sided aperture of the panel B.

As shown in particular in FIG. 3, the lap belt section 14A of the safety belt 14 in the normal use position of the lap belt section 14A runs specific to an individual. In the assembled state of the panel B, it essentially runs along the side surface of panel B in the direction of the top side of the aperture 18 of the height adjuster 16 to the pelvis of a seated individual.

The lap belt section 14A comprises a fastening element 14B with which the lap belt section 14A is fixed to the vehicle body at the B-pillar in the lower region of the B-pillar. On the opposite side, the body-mounted belt buckle 4C for closing the safety belt 14 is shown.

In the event of a crash, the lap belt section 14A of the closed safety belt 14 comes into two-dimensional contact with the first vertical wall region V1, resulting in a direct, applied force on the first vertical wall region V1 with a transmission of force inside the panel B to the horizontal wall region W1 and the second vertical wall region V2.

The lap belt section 14A also at least partially abuts the essentially horizontal wall region W1 near the top side of the aperture 18, resulting in a direct application of force also in this region W1 to the panel B.

Possibly, the lap belt section 14A also impacts the essentially second vertical wall region V2, whereby also in this region V2 there is a direct application of force to the panel B.

These two-dimensional regions V1, W1, V2 affected by the lap belt section 14A define the critical region K (FIG. 2) in which in the event of a crash, the highest stresses occur via the applied force. The aperture 18 and the configuration of the panel B themselves make the structure less stable precisely in this region, whereby the three-dimensional structure of the panel B may not withstand the applied force in the event of a crash. Any type of deformation of the panel B or possible cracking of the panel B or the like must therefore be reliably prevented.

The measures required for this purpose are realized according to the invention via a panel holder H arranged on the inner side I (invisible in the assembled state) of the panel B at the panel B, and in the installed state, arranged at the structure of the vehicle seat 100.

Figure 4:
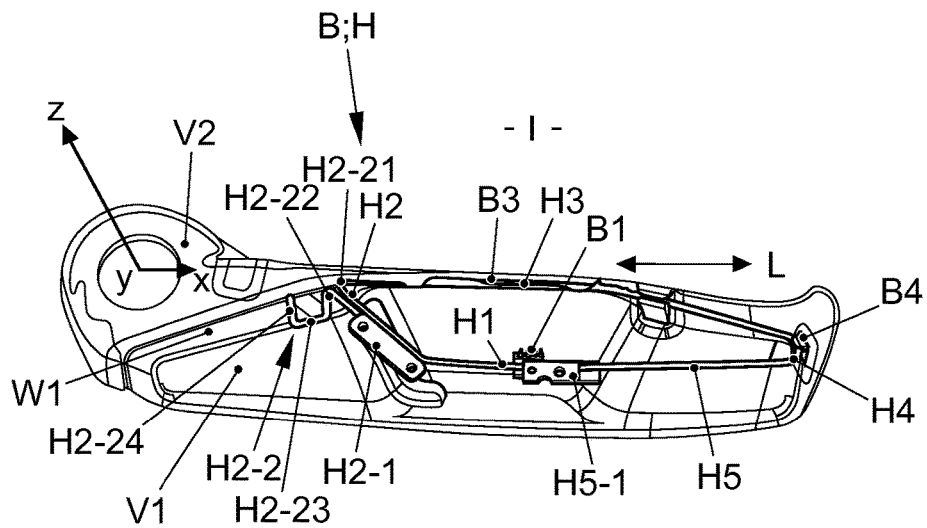
FIG. 4 is an interior view of the panel with the panel holder in the assembled state.
Figure 5:
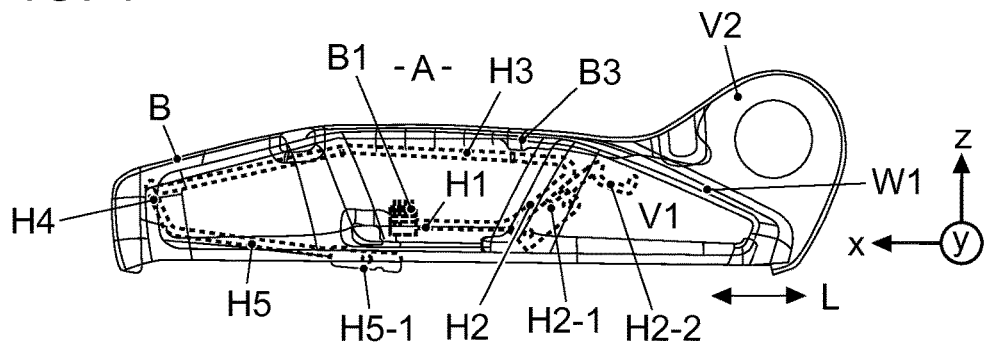
FIG. 5 is an exterior view of the panel with the panel holder in the assembled state (panel depicted transparently)
Figure 6:
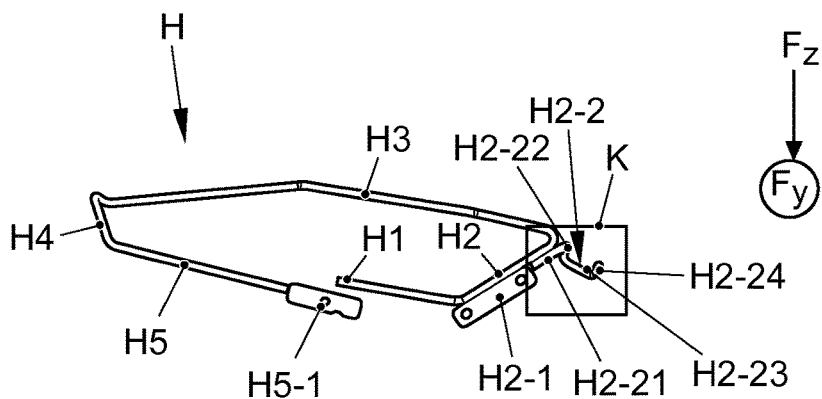
FIG. 6 is a view only of the panel holder in the position according to FIG. 5.

FIG. 4 shows the inner side I and FIG. 5 an outer side A of the panel holder H in the assembled state, whereas FIG. 6 shows the panel holder H alone in the position, analog in the position shown in FIG. 5.

It is also recommended to regard FIGS. 4 to 6 from an overall view.

The panel holder H is essentially designed as a three-dimensionally formed wire frame made from a reinforcing wire. A plurality of provisions at the wire frame are realized, which serve for structure-side fastening at the seat portion 12 of the vehicle seat 100 and structure-side stability of the panel B, as well as positioning of the panel B at the structure of the seat portion 12 of the vehicle seat 100.

Below, the panel holder H and the panel B are described per FIG. 4 in clockwise rotation or per FIGS. 5 and 6 in counter-clockwise rotation.

The wire of the panel holder H features a free end at a first bottom limb H1. In addition, the panel holder H features a first holding element H2-1 at a first lateral limb H2 which is arranged at the limb H2, which is configured between the first, bottom limb H1 and an upper limb H3 of the wire frame wire.

Further, the panel holder H features a support bracket H2-2 which is arranged at the wire of the first lateral limb H2.

In addition, the panel holder H comprises the upper limb H3 to which a second lateral limb H4 attaches. A second bottom limb H5 forms a free end at which a second holding element H5-1 is arranged.

In the assembled state, the free end of the first bottom limb H1 clasps a clip that is arranged at the inner side I of the panel B and snaps into place. The snap-on connection between the panel B and the panel holder H is secured by an integral hinge which is laid over the snap-on connection. The clip and the integral hinge are both labeled with the reference sign B1.

The first holding element H2-1 of the panel holder H at the first lateral limb H2 features apertures with enable via fasteners a first fastening of the panel holder H at the structure of the seat portion 12 of the vehicle seat 100.

The support bracket H2-2 of the panel holder H which is also arranged at the first lateral limb H2 features a first clip element H2-21 as connector, which is arranged parallel to the first lateral limb H2 and is firmly connected with the first lateral limb H2.

Forces induced into the support bracket H2-2, in particular from the y-direction and the z-direction, are induced in the installed state via the first clip element H2-21 on the first lateral limb H2 which is supported by the first holding element H2-1 at the structure of the seat portion 12 of the vehicle seat 100. The application of force into the adjacent structure of the seat portion 12 takes place indirectly, starting from the support bracket H2-2.

The first clip element H2-21 transitions into a U-bolt which comprises the clip elements H2-22, H2-23 and H2-24.

The second and fourth clip elements H2-22, H2-24 are aligned in y-direction transversely to the longitudinal axis L of the panel holder H or the panel B.

The third clip element H2-23 is aligned transversely to the y-direction and thus essentially in the direction of the longitudinal axis L of the panel holder H, or the panel B in the x-direction.

The length of the second and fourth clip element H2-22, H2-24 corresponds to the distance between the inner side of the panel B and the structure of the seat portion 12 of the vehicle seat 100.

The third clip element H2-23 connects the second and fourth clip elements H2-22, H2-24 to one another, whereby the length of the third clip element H2-23 is selected in such a way that it is arranged centered inside the critical region K and at least partially spans the critical region K in the x-direction. The mechanism of such a support bracket H2-2 described above which is designed inside the panel B as part of the panel holder H, is explained in detail below.

In the assembled state, the upper limb H3 of the panel holder H is guided in rear mounts B3 of the panel B in the y-direction and the z-direction. The upper limb H3 clasps the rear mounts B3 which are provided on the inner side I of the top side of the panel B.

The second lateral limb H4 clasps a clip which is arranged at the inner side I of the panel B and snaps into the clip. The snap-on connection between the panel B and the panel holder H is secured by an integral hinge which is laid over the snap-on connection. The clip and the integral hinge are both labeled with the reference sign B4. This snap-on connection between the panel B and the panel holder H is designed analogous to the snap-on connection of the clip and the integral hinge B1, wherein additionally, stabilizing ridges are arranged above the snap-on connection of the clip and the integral hinge B4 on the inner side I of the panel B. Such ridges can also be designed in the region of the snap-on connection of the clip and the integral hinge B1.

The second lateral limb H4 of the panel holder H is aligned wire-side in such a way, that the wire is arranged parallel to the panel B, essentially running along the x/z-plane. This way, via the snap-on connection of the clip and the integral hinge B4 of the second lateral limb H4 of the panel holder H in the assembled state, a positioning of the panel B in the x-direction is achieved. Via the ridges, support and fixation of the wire in z-direction of the wire in the region of the second lateral limb H4 at the panel B is also achieved.

The additional, lower limb H5 forms the second free end with the second holding element H5-1. The second holding element H5-1 of the panel holder H features apertures analogous to the first holding element H2-1 which, in the installed state, enable via fasteners a second fastening of the panel holder H at the structure of the seat portion 12 of the vehicle seat 100.

The first holding element H2-1 of the panel holder H at the first lateral limb H2 features apertures which enable via fasteners a first fastening of the panel holder H at the structure of the seat portion 12 of the vehicle seat 100.

It is understood that the panel holder H can be arranged at any other nearby structure, in particular the body of the vehicle or similar.

The mechanism of the panel holder H, arranged in the assembled state at panel B, and attached in the exemplary embodiment at the structure of the seat portion 12 of the vehicle seat 100 (installed state) via the holding elements H2-1 and H5-1, is further detailed below for the event of a crash, whereby the advantages of the invented solution are further illustrated.

In the event of a crash, due to the lap belt section 14A which two-dimensionally affects the panel B, a very strong, applied force occurs in the previously defined critical region K, in the first vertical wall region V1, at least partially in the essentially horizontal wall region W1, and possibly also in the essentially second vertical wall region V2.

The force components Fy and Fz of the acting crash force which affect the panel B act on the panel B in y-direction and in z-direction such as is symbolically referred to in FIG. 6 at the critical region K. From the observer's viewpoint, the force component Fy impacts the sheet plane.

The force component Fz acting from a vertical direction on the panel B is received by the upper limb H3 and induced via the first lateral limb H2 into the fixed holding element H2-1 on the structure side, and thereby indirectly into the structure, starting from the upper limb H3.

In addition, the support bracket H2-2 overall forms a support for the essentially horizontal wall region W1 of the panel B since the top side of the u-shaped support bracket H2-2 (H2-22 to H2-24) in the critical region K forms a two-dimensional bearing for the panel B.

The force component Fz acting from a vertical direction on the panel B is received by the first clip element H2-21. The force component is then induced by the first lateral limb H2 into the holding element H2-1 fixed on the structure side, and with that from the support bracket H2-2 indirectly into the structure.

The force component Fy acting on the panel B from the horizontal direction is received in the critical region K by the support bracket H2-2.

The third clip element H2-23 is aligned transversely to the y-direction and thus essentially in the direction of the longitudinal axis L of the panel holder H or the panel B. The third clip element H2-23 is arranged at the junction between the vertical wall region V1 and the essentially horizontal wall region W1.

The length of the third clip element H2-23 is selected in such a way that the force component Fy centrally impacts the third clip element H2-23 in the critical region K.

In particular, the force component Fy acting in the exposed transitional region between the vertical wall region V1 and the essentially horizontal wall region W1 is thereby received by the third clip element H2-23, and is directly induced via the second and fourth clip element H2-22 and H2-24 of the support bracket H2-2 into the structure.

Since the length of the second and the fourth clip element H2-22, H2-24 corresponds to the distance between the inner side of the panel B and the structure of the seat portion 12 of the vehicle seat 100, the force component Fy is securely and directly induced into the adjacent structure since the free end of the fourth clip element H2-24 is supported directly at the adjacent structure of the seat portion 12 in the event of a crash. Even normally, the second clip element H2-22 is supported by its occupied end on the structure side directly at the adjacent structure.

According to the invention, the free end of the fourth clip element H2-24 features a small distance to the structure of the seat portion 12 so that normally, the free end of the fourth clip element H2-24 of the support bracket H2-2 of the panel holder H does not abut the structure of the seat portion 12 and possibly produce an undesired rattling. A distance of, for example, 4 mm is planned. Not until a possible crash occurs does the radius between the second clip element H2-22 and the third clip element H2-23 change. The impact of the crash force leads to a deformation and change in the radius so that the free end of the fourth clip element H2-24 of the support bracket H2-2 only comes into contact with the seat structure 12 in the event of a crash, thereby fully unfolding its effect.

In addition, the second clip element H2-22 is connected with the first clip element H2-21 via its occupied end, whereby in particular the force component Fy also indirectly induces the force acting on the second clip element H2-22 from the y-direction via the first holding element H2-1. This is fixed structure-side, starting from the second clip element H2-22 of the support bracket H2-2 into the adjacent structure, also via the first clip element H2-21 that is connected with the first lateral limb H2.

It becomes clear that the panel holder H existing in the installed state is, in the assembled state with the panel B and by nature of its design and connection to the panel B, able to absorb a crash force in the event of a crash. In the critical region K, the support bracket H2-21 is arranged at the panel holder H in the event of a crash, whereby the critical region K of the panel B is not critical in the event of a crash since the material stability and the form stability of the panel B are secured via the panel holder H with the integrated support bracket H2-2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A panel holder comprising:
   at least one wire that has at least one first element fastening the panel holder on a fixed structure adjacent to the panel holder; and
   at least one second element fastening the panel holder at a panel arranged laterally along a side of a seat portion,
   wherein the at least one wire forms a support bracket that in an assembled state of the panel holder and the panel is arranged in a critical region of the panel in which, in the event of a crash, a strong crash force acts upon the panel.

2. A panel comprising a panel holder according to claim 1.

3. A vehicle seat with a panel holder integrated in a panel according to claim 1.

4. The panel holder according to claim 1, wherein the wire of the panel holder is formed into a wire frame which comprises at least one limb.

5. The panel holder according to claim 4, wherein the at least one limb in the assembled state of the panel holder and the panel is arranged near the critical region of the panel or at least partially protrudes into the critical region of the panel.

6. The panel holder according to claim 4, wherein the support bracket is integrally formed or arranged at the at least one limb.

7. The panel holder according to claim 4, wherein the support bracket branches off the at least one limb and is arranged in a central region of the critical region in the assembled state.

8. A panel holder comprising:
   at least one wire that has at least one first element for fastening the panel holder on a fixed structure adjacent to the panel holder; and
   at least one second element for fastening the panel holder at a panel,
   wherein the at least one wire forms a support bracket that in an assembled state of the panel holder and the panel is arranged in a critical region of the panel in which, in the event of a crash, a strong crash force acts upon the panel,
   wherein the wire of the panel holder is formed into a wire frame which comprises at least one limb,
   wherein the at least one limb in the assembled state of the panel holder and the panel is arranged near the critical region of the panel or at least partially protrudes into the critical region of the panel,
   wherein the support bracket is integrally formed or arranged at the at least one limb, and
   wherein the support bracket branches off the at least one limb and is arranged in a central region of the critical region in the assembled state.

9. The panel holder according to claim 8, wherein the at least one clip element of the support bracket indirectly induces the crash force in the adjacent structure via the at least one limb, since the at least one limb features a holding element, which in the assembled state of the panel holder that is connected to the panel, is firmly connected with the structure.

10. The panel holder according to claim 9, wherein the at least one clip element of the support bracket indirectly and directly induces the crash force in the adjacent structure.

11. The panel holder according to claim 8, wherein the at least one clip element of the support bracket directly induces the crash force in the adjacent structure, since the at least one clip element in the assembled state of the panel holder connected to the panel is supported at an inner side of the panel and directly at the adjacent structure.

12. The panel holder according to claim 8, wherein the clip elements are integrally formed or arranged via a further clip element at the at least one limb.

13. A panel holder comprising:
    at least one wire that has at least one first element for fastening the panel holder on a fixed structure adjacent to the panel holder; and
    at least one second element for fastening the panel holder at a panel,
    wherein the at least one wire forms a support bracket that in an assembled state of the panel holder and the panel is arranged in a critical region of the panel in which, in the event of a crash, a strong crash force acts upon the panel, and
    wherein the support bracket comprises at least one clip element, which supports the panel and absorbs a crash force in the critical region and supports the panel at the adjacent structure so that the crash force is induced in the adjacent structure.

14. The panel holder according to claim 13, wherein the support bracket is designed u-shaped,
    wherein two clip elements are arranged transversely to a longitudinal axis of the panel holder existing in the assembled state of the panel holder and the panel, and
    wherein a clip element linking the two clip elements is arranged in a direction of the longitudinal axis of the panel holder existing in the assembled state of the panel holder and panel.

15. A panel holder for a vehicle seat, the panel holder comprising:
    a wire that has a first element fastening the panel holder on a fixed structure adjacent to the panel holder; and
    a second element fastening the panel holder at a panel,
    wherein the wire forms a support bracket that in an assembled state of the panel holder and the panel is arranged in a region of the panel at which a lap belt section of a safety belt engages.

16. The panel holder according to claim 15, wherein the panel is arranged laterally along a side of the vehicle seat.

17. The panel holder according to claim 15, wherein in the assembled state the panel holder is integrated in the panel.

18. A vehicle seat, comprising:
    a panel arranged laterally along a side of the vehicle seat; and
    a panel holder integrated in the panel, the panel holder comprising:
        a wire that has a first element fastening the panel holder on a fixed structure adjacent to the panel holder; and
        a second element fastening the panel holder at the panel,
    wherein the wire forms a support bracket that in an assembled state of the panel holder and the panel is arranged in a region of the panel at which a lap belt section of a safety belt engages.

19. The vehicle seat according to claim 18, further comprising a height adjustment lever,
    wherein the panel comprises a recess through which the height adjustment lever protrudes.

* * * * *